(12) United States Patent
Lisaj et al.

(10) Patent No.: US 10,789,830 B2
(45) Date of Patent: Sep. 29, 2020

(54) METHOD AND APPARATUS FOR GATHERING VISUAL DATA USING AN AUGMENTED-REALITY APPLICATION

(71) Applicant: MOTOROLA SOLUTIONS, INC., Chicago, IL (US)

(72) Inventors: Andrzej Lisaj, Cracow (PL); Mateusz Kolasa, Nowy Targ (PL); Grzegorz Kaplita, Rzeszow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/482,742

(22) PCT Filed: Mar. 2, 2017

(86) PCT No.: PCT/PL2017/050012
§ 371 (c)(1),
(2) Date: Aug. 1, 2019

(87) PCT Pub. No.: WO2018/160080
PCT Pub. Date: Sep. 7, 2018

(65) Prior Publication Data
US 2019/0378400 A1    Dec. 12, 2019

(51) Int. Cl.
*G08B 25/10*    (2006.01)
*A63F 13/216*    (2014.01)
*A63F 13/332*    (2014.01)
*A63F 13/65*    (2014.01)

(52) U.S. Cl.
CPC ............ *G08B 25/10* (2013.01); *A63F 13/216* (2014.09); *A63F 13/332* (2014.09); *A63F 13/65* (2014.09); *A63F 2300/8082* (2013.01)

(58) Field of Classification Search
CPC ...... G08B 25/10; A63F 13/216; A63F 13/332; A63F 13/65; G06T 19/006; G06F 3/011; G06F 3/017; H04W 4/029; H04W 4/90
See application file for complete search history.

(56) References Cited

U.S. PATENT DOCUMENTS

| 8,760,290 B2 | 6/2014 | Piett et al. |
| 9,852,599 B1* | 12/2017 | Slavin ................. G08B 25/10 |
| 2011/0319148 A1 | 12/2011 | Kinnebrew et al. |
| 2012/0052954 A1 | 3/2012 | Zhu et al. |

(Continued)

OTHER PUBLICATIONS

Nicole Kosoris and Jeff Chastine: "A Study of the Correlations Between Augmented Reality and Its Ability to Influence User Behavior", The 20th International Conference on Computer Games, CGAMES 2015, 978-1-4673-7921-2/15/$31.00 © 2015 IEEE, pp. 113-118.

(Continued)

*Primary Examiner* — Orlando Bousono (57) ABSTRACT

A method and apparatus for gathering visual data using an augmented-reality application is provided herein. During operation a location for a public-safety area of interest is determined. The location is provided to an augmented-reality server where an augmented-reality application (e.g., an augmented-reality game) is modified to place a virtual image in a position that is based on the public-safety area of interest. Images are then obtained from devices that point their cameras towards the public-safety area of interest.

17 Claims, 6 Drawing Sheets

(56) References Cited

U.S. PATENT DOCUMENTS

| | | |
|---|---|---|
| 2012/0231887 A1 | 9/2012 | Lee et al. |
| 2013/0100306 A1 | 4/2013 | Bekiares et al. |
| 2014/0129130 A1 | 5/2014 | Kuramura et al. |
| 2014/0368601 A1* | 12/2014 | deCharms .............. H04L 65/403 |
| | | 348/14.02 |
| 2015/0269835 A1* | 9/2015 | Benoit .................. H04M 19/04 |
| | | 340/539.13 |
| 2016/0192166 A1* | 6/2016 | deCharms ................ H04L 67/18 |
| | | 348/14.02 |
| 2016/0232777 A1* | 8/2016 | Jedwab ............ G08B 13/19602 |
| 2017/0024088 A1* | 1/2017 | La Pean .................. H04W 4/90 |

OTHER PUBLICATIONS

The International Search Report and the Written Opinion corresponding serial No. PCT/PL2017/050013 filed Mar. 2, 2017, all pages.

* cited by examiner

METHOD AND APPARATUS FOR GATHERING VISUAL DATA USING AN AUGMENTED-REALITY APPLICATION

RELATED APPLICATIONS

The present invention is related to application Ser. No. 16/482,730, entitled Method and Apparatus for Gathering Visual Data Using an Augmented-Reality Application, and assigned to the assignee of the present application.

FIELD OF THE INVENTION

The present invention generally relates to forwarding a camera image, and more particularly to a method and apparatus for forwarding a camera image from a device, the device directed via an augmented-reality application.

BACKGROUND OF THE INVENTION

Augmented reality game play utilizes a technology that superimposes a computer-generated image on a user's view of the real world, thus providing a composite view of the real world and the computer-generated image. During such game play, a user's surroundings will appear on a device, with the surroundings "augmented" as part of the game. For example, Pokémon Go® is location-based augmented reality game developed by Niantic for iOS and Android devices. In the game, players use a mobile device's global-positioning system (GPS) capability to locate, capture, battle, and train virtual creatures, called Pokémon, who appear on the screen as if they were in the same real-world location as the player.

Public-safety institutions often need to gather visual data. The visual data is mostly captured from cameras placed in various locations. The images may be needed for example to identify specific individuals, get details about risks at specified place, gathering intelligence data in incidents area, . . . , etc. In many cases there are no cameras in areas where images are needed. It would be beneficial if augmented-reality game play could be utilized to provide public-safety institutions with much-needed visual data.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for gathering visual data using an augmented-reality application (e.g., a augmented-reality game) is provided herein. During operation a location for a public-safety area of interest is determined. The location is provided to an augmented-reality server that modifies an augmented-reality application (e.g., an augmented-reality game) to place or modify a virtual image in a position that is based on the public-safety area of interest. Images are then obtained from player devices running the augmented-reality application that point their cameras towards the public-safety area of interest.

It should be noted that the above technique may also be utilized to move people away from a particular area. For example, assume that a dangerous incident has been reported at a particular location. The location may be provided to an augmented-reality server where an application/game is modified to place or modify a virtual image in a position that is based on the particular location. The position will be such that people are directed away from the location.

Expanding on the above, assume that a public-safety dispatcher decides that they need more insight on specific area. The dispatcher may direct a game server to put a virtual object (e.g., a rare object, interesting artifacts, . . . , etc.) in the specific area. People passing by this area that have the game (application) installed on their player devices (e.g., smart phones) will tend to point their player device's camera at location specified by the dispatcher. The player devices are instructed to automatically take an image when pointed at the virtual object (or alternatively pointed in the direction of the specific area). Images taken by players are sent back to the dispatcher. More specifically, the virtual-reality game that is run on a player device will include the instructions to access a camera and take an image of the surroundings when certain conditions are met. For example, the detection of a virtual object may cause an image to be obtained and forwarded to the game server.

The dispatcher is able to change the field of view of images received by influencing the placement of the virtual object or by controlling behavior of virtual characters. It is assumed that game players will not be aware when or where game play was influenced by the dispatcher. Additionally, it is preferable to have images automatically captured without user knowledge.

As an example of the above, assume somebody calls 911 reporting a fire at a particular location. Assume that the dispatcher has doubts about the credibility of the report. Visual confirmation of the fire would be helpful. The dispatcher may provide a game server the location of the fire which will locate a virtual image at or near the location that encourages people to point their phone cameras toward the location. Images of the location are transferred to the dispatch operator. For example, people a mile away may point their devices in the air in the direction of the fire to determine if smoke is seen or not. These images are provided to the dispatch operator.

As a further example of the above, assume that a bank robbery occurs and the police need to make sure that there are minimal number of bystanders in the affected area. The dispatcher may influence game play as described above to make sure players will leave affected area and potential access routes which may be used by first responders. This may be accomplished by placing virtual objects along desired routes for bystanders. Virtual objects may be modified as well. For example, a game player may interact with virtual character (e.g. fight, talk, . . . , etc). The behavior of virtual character may impact of behavior (movement) of a player. For example, the character may say, "follow me!", or may move in a certain direction in order to influence the movement of the player.

As a further example of the above, consider a police officer's need to follow a suspect. To minimize the risk of undercover operations being discovered by the suspect, the observation is handled over to augmented reality game players. The dispatcher can influence the game play as described above to make sure the suspect's route is under observation of cameras from smartphone of game players.

It should be noted that any augmented-reality application server may not be able to deliver photos in real time (e.g. a game player may need additional time to arrive at incident scene). A dispatch center may put in a request for a photo, and at a later time, be notified that the photo is available.

The following definitions are provided to set the necessary background for utilization of the preferred embodiment of the present invention.

Public-Safety Incident—An event or occurrence that involves first responders e.g., (police, fire, military, coastguard, . . . etc.). Such occurrences include, but are not limited to a fire, a crime, a weather-related event such as a lightning strike, suspicious activity, graffiti, . . . , etc.

Public-Safety Area of Interest—A geographic area where images may provide information on a public-safety incident.

Augmented-Reality Application—Any program or game that superimposes a computer-generated image on a user's view of the real world, thus providing a composite view of the real world and computer-generated image. During execution of such an application, a user's surroundings will appear on a player device, with the surroundings "augmented" with images as part of the application. Other examples of augmented-reality applications are applications such as a "find-my-car" application for parking lots, mapping applications for route planning, . . . , etc.

Image—a video, picture, or live feed of an object or area.

Virtual Object—A object that is virtual as opposed to real. Such an object may exist as part of an augmented-reality game or may simply be a random object place on a player device in order to direct the user's camera to a particular point. In other embodiment virtual object may be implemented as virtual character or hero, who may expose particular behavior or emotions and interact with an Augmented-Reality Application user.

Player Device—a preferably-mobile device that runs an augmented-reality application that places a virtual object placed within the augmented-reality game. The position of the virtual object will depend upon a location of a public-safety incident. The player device will preferably have an image-capture device that automatically captures images as part of the augmented-reality game.

Figure 1:
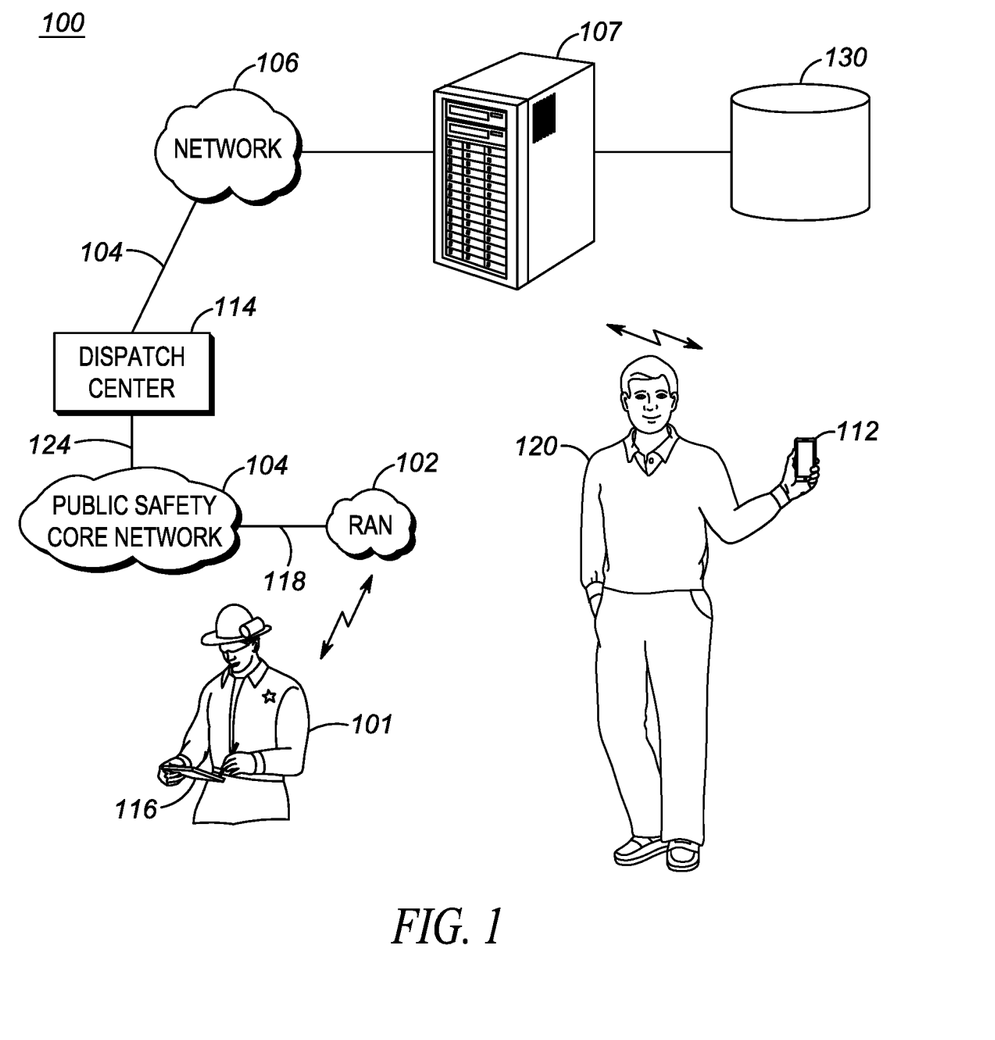
FIG. 1 shows a general operating environment for the present invention.

Turing now to the drawings wherein like numerals designate like components, FIG. 1 is a general operating environment 100 for the present invention. Environment 100 includes one or more radio access networks (RANs) 102, a public-safety core network 104, player device 112, a computer 114, and communication links 118, 124. In a preferred embodiment of the present invention, computer 114 serves as a public-safety dispatch center 114. Game server 107 executes an augmented-reality game, providing the necessary game data to remote unit (device) 112. It should be noted that the term "game server" and "application server" are used interchangeably, and simply mean a server that runs an augmented-reality application, which may be an augmented-reality game.

Game server 107 is coupled to game database 130. Database 130 comprises information necessary for server 107 to appropriately execute a particular game. For example, database 130 may comprise player information, player levels, player locations, battle information, virtual-object locations, . . . , etc. It should be noted that although only one server 107 is shown coupled to database 130, there may exist many servers 107 providing game services to players, with each server 107 sharing database 130 (or a copy of database 130).

In one embodiment of the present invention, game server 107 is shown as a separate entity from dispatch center 114. Communication between dispatch center 114 and game server 107 takes place through an intervening network such as, but not limited to a cellular communication system 106. Thus, as shown in FIG. 1, two separate networks exist, namely public-safety core network 104, and public network 106 (e.g., Verizon, Spring, AT&T, . . . , etc.).

Each RAN 102 includes typical RAN elements such as base stations, base station controllers (BSCs), routers, switches, and the like, arranged, connected, and programmed to provide wireless service to user equipment (e.g., tablet computer 116 operated by officer 101) in a manner known to those of skill in the relevant art.

In a similar manner, network 106 includes elements such as base stations, base station controllers (BSCs), routers, switches, and the like, arranged, connected, and programmed to provide wireless service and game-play data to user equipment (e.g., smartphone 112 operated by user 120) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications.

Player device 112 and device 116 may be any suitable computing and communication devices configured to engage in wireless communication over an air interface as is known to those in the relevant art. Player device 112 may comprise any device capable of participating in an augmented-reality game play and comprising a camera (not shown). For example, player devices 112 may comprise a mobile device running an Android™ or iOS™ operating system and having a camera and a GPS receiver capable of determining a location. Device 116 may be a tablet computer capable of displaying video/pictures sent to it from dispatch center 114. For example, an image collected by player device 112 may be relayed to dispatch center 114, and then to any officer 101 by relaying the image to device 116.

Finally, computer 114 is part of a computer-aided-dispatch center, manned by an operator providing location information to server 107 and receiving images from server 107. For example, computer 114 typically comprises a graphical user interface that provides the dispatch operator necessary information about public-safety incidents. As discussed above, a location of the incident may be provided to server 107, and in response, an image (obtained from player device 112) may be obtained of the incident from server 107. This mage may be then provided to device 116.

Figure 2:
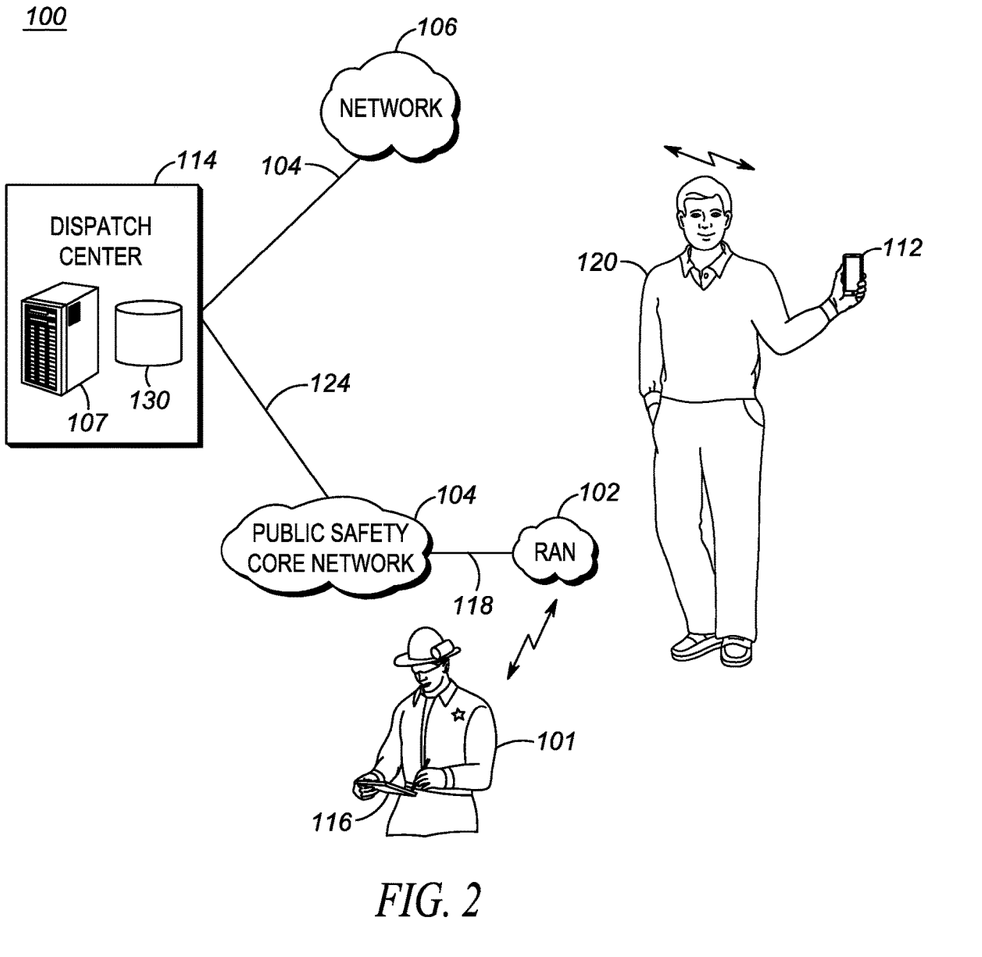
FIG. 2 shows a general operating environment for the present invention.

It should be noted that in an alternate embodiment of the present invention, server 107 may reside within dispatch center 114. This configuration is shown in FIG. 2.

During operation, dispatch center 114 receives information on a particular public-safety incident. This information may come from the public via emergency (911) calls through the phone system (not shown), or from public-safety officers. For example, dispatch center 114 may receive a 911 call reporting a fire at a particular location, or dispatch center 114 may receive information from officer 101 regarding a particular route a suspect is taking.

Regardless of where public-safety incident data is obtained, dispatch center 114 receives a location of the incident and provides the location of the incident to game server 107. Along with the location, other data about the incident may be provided to game server 107. For example, information as to whether or not a picture is wanted of the incident scene (public-safety area of interest), or whether or not individuals are to be directed away from the public-safety area of interest may be provided to game server 107.

In response to the above, game server 107 modifies game play for player devices near (e.g., within a mile) the public-safety area of interest that are playing an augmented-reality game. For example, users 120 of player devices 112 may be incentivized to move in a particular direction based on the information received from dispatch center 114. As part of incentivizing users, a virtual object may be placed within the game at a particular position that is based on the location of the public-safety area of interest. Additionally, virtual objects may be modified as well. For example, a game player may interact with virtual character (e.g. fight, talk, . . . , etc). The behavior of virtual character may impact of behavior (movement) of a player. For example, the character may say, "follow me!", or may move in a certain direction in order to influence the movement of the player. This is illustrated in FIG. 3.

Figure 3:
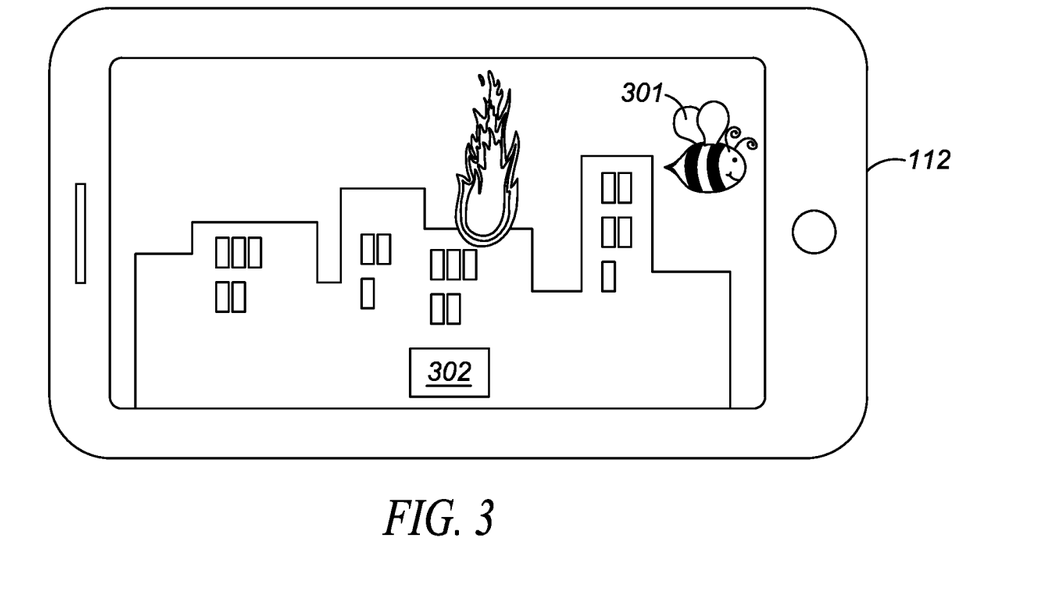
FIG. 3 illustrates the placement of a virtual object in order to capture an image of a public-safety incident.

As shown in FIG. 3, virtual object 301 has been superimposed on a real-world background 302. In this particular example, a building is on fire, and an image of the building is desired. A camera within player device 112 will trigger when the appropriate field of view is within the camera. The triggering of the camera may be simply based on when the virtual object is detected by the player device, or based on the camera field of view (FOV).

A camera FOV (as determined by player device 112) may comprise a camera's location and its pointing direction, for example, a GPS location and a compass heading. Based on this information, a FOV can be determined. For example, a current location of a camera may be determined from an image (e.g., 42 deg 04' 03.482343" lat., 88 deg 03' 10.443453" long. 727 feet above sea level), and a compass bearing matching the camera's pointing direction may be determined from the image (e.g, 270 deg. from North), a level direction of the camera may be determined from the image (e.g., −25 deg. from level), and a magnification (zoom) may be determined (e.g., 10×) from the image. From the above information, the camera's FOV is determined by determining a geographic area captured by the camera having objects above a certain dimension resolved. For example a FOV may comprise any geometric shape that has, for example, objects greater than 1 cm resolved (occupying more than 1 pixel). When the camera FOV overlaps the desired FOV, an image may be obtained.

It should be noted that the image is obtained as part of the game, and the user may be unaware that an image was taken. The image is then supplied to game server 107 as part of the gaming data. This image is then provided to dispatch center 114.

Figure 4:
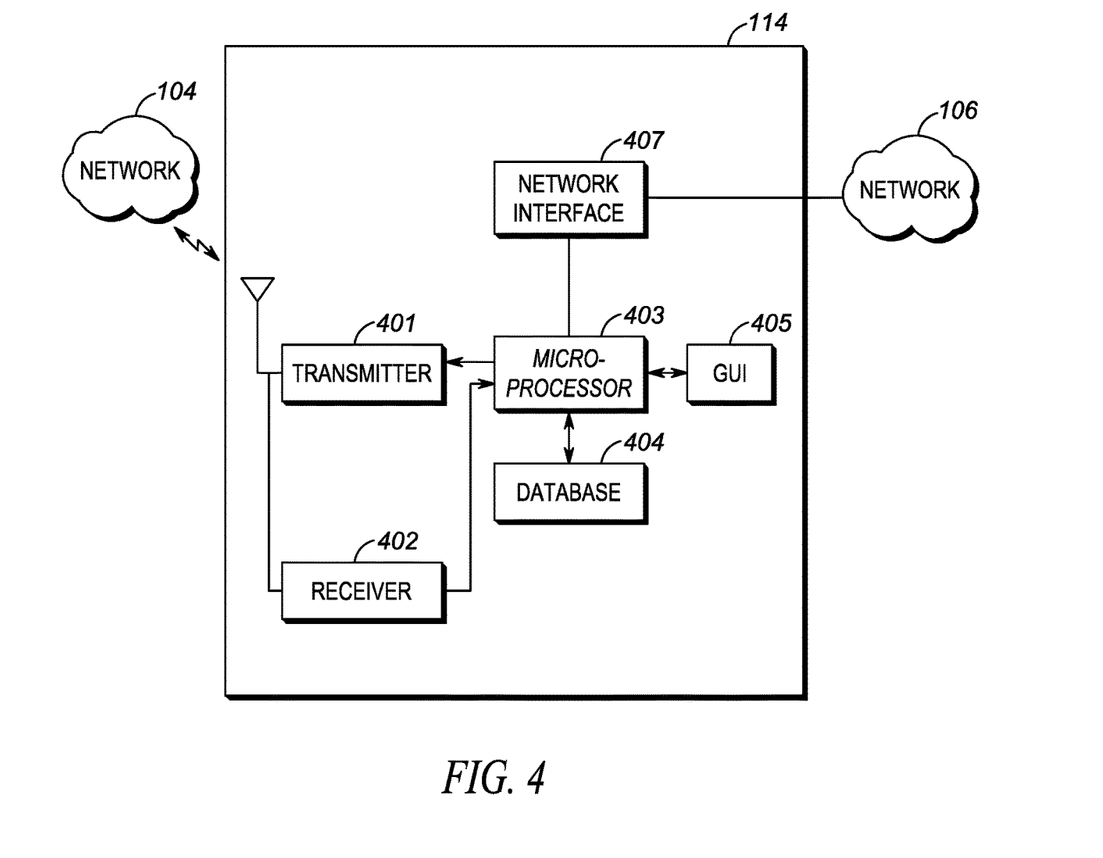
FIG. 4 is a block diagram of a dispatch center of FIG. 1.

FIG. 4 is a block diagram of the dispatch center of FIG. 1. As shown, dispatch center 114 may include transmitter 401, receiver 402, graphical-user interface (GUI) 405, logic circuitry 403, and memory 404. In other implementations, dispatch center 114 may include more, fewer, or different components.

Transmitter 401 and receiver 402 are preferably wireless, and may be long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 401 and receiver 402 may also contain multiple transmitters and receivers, to support multiple communications protocols simultaneously. For example, transmitter 401 and receiver 402 may use a first communication-system protocol for communicating with officer 101 over network 104, and use a second communication-system protocol for communicating with server 107 over network 106.

Graphical-User Interface (GUI) 405 comprises a screen (e.g., a liquid crystal display (LCD), organic light-emitting diode (OLED) display, surface-conduction electro-emitter display (SED), plasma display, field emission display (FED), bistable display, projection display, laser projection, holographic display, etc.) that can display images, maps, incident data, . . . , etc. GUI 405 receives an input from a user to initiate an attempt to capture an image. The input may comprise information on an incident such as, but not limited to, a location of the incident, a severity of the incident, whether or not an image of the incident is desired, whether or not people are to move away from the incident, . . . , etc. In order to provide the above features (and additional features), GUI 405 may include a monitor, a keyboard, a mouse, and/or various other hardware components to provide a man/machine interface.

Logic circuitry 403 comprises a digital signal processor (DSP), general purpose microprocessor, a programmable logic device, or application specific integrated circuit (ASIC) and is utilized to receive the input from GUI 405 and generate a request for an image.

Memory 404 comprises standard random-access memory, and is used to store information such as, but not limited to maps, incident data, images, . . . , etc.

In an illustrative embodiment, network 106 is attached (i.e., connected) to dispatch center 114 through network interface 407 and communicates with processor 403. Network 106 is connected via a wired connection to network interface 407, although this connection may be wireless in alternate embodiments. Network interface 407 includes elements including processing, modulating, and transceiver elements that are operable in accordance with any one or more standard or proprietary wired or wireless interfaces, wherein some of the functionality of the processing, modulating, and transceiver elements may be performed by means of processor 403.

In the illustrative embodiment, network 104 is attached (i.e., connected) to dispatch center 114 through transmitter 401 and receiver 402 both of which communicate with processor 403. Network 104 is connected to dispatch center 114 via a wireless connection, although this connection may be wired in alternate embodiments.

Figure 5:
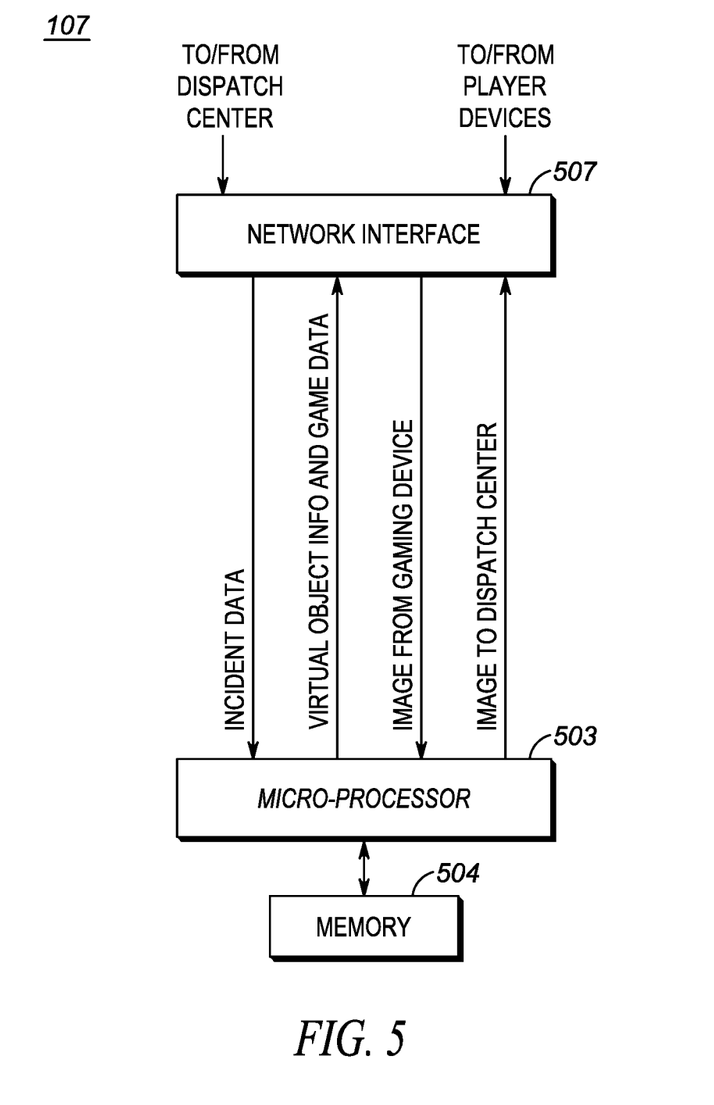
FIG. 5 is a block diagram of an application server of FIG. 1.

FIG. 5 is a block diagram of an application server shown in FIG. 1. As shown, application server 107 may include logic circuitry 503, and memory 504. In other implementations, application server 107 may include more, fewer, or different components.

Logic circuitry 403 comprises a digital signal processor (DSP), general purpose microprocessor, a programmable logic device, or application specific integrated circuit (ASIC) and is utilized to receive a request for an image (including an incident location) and provide the image to the dispatch center.

Memory 404 comprises standard random-access memory, and is used to store information such as, but not limited to maps, incident data, images, . . . , etc.

In the illustrative embodiment, player devices 112 and dispatch center 114 are attached (i.e., connected) to application server 107 through network interface 507 and communicates with processor 503. Network interface 507 includes elements including processing, modulating, and transceiver elements that are operable in accordance with any one or more standard or proprietary wired or wireless interfaces, wherein some of the functionality of the processing, modulating, and transceiver elements may be performed by means of processor 503.

Network interface 507 is configured to receive incident data from a dispatch center. The incident data including a location of an area of interest. The incident data may also include whether or not an image is desired, and whether or not pedestrians are to be directed away from the area.

Network interface 507 is also configured to forward a virtual object as part of game play to a player device along with a trigger that directs the player device to capture an image when certain conditions are met. For example, the image capture may be triggered upon detection of the virtual object, or may be triggered upon a field-of-view of the player device overlapping the area of interest. The trigger and virtual object are preferably transferred as part of normal game-play messaging.

Network interface 507 is also configured to receive an image of the desired area of interest from the player device and forward the image to the requestor (dispatch center).

Figure 6:
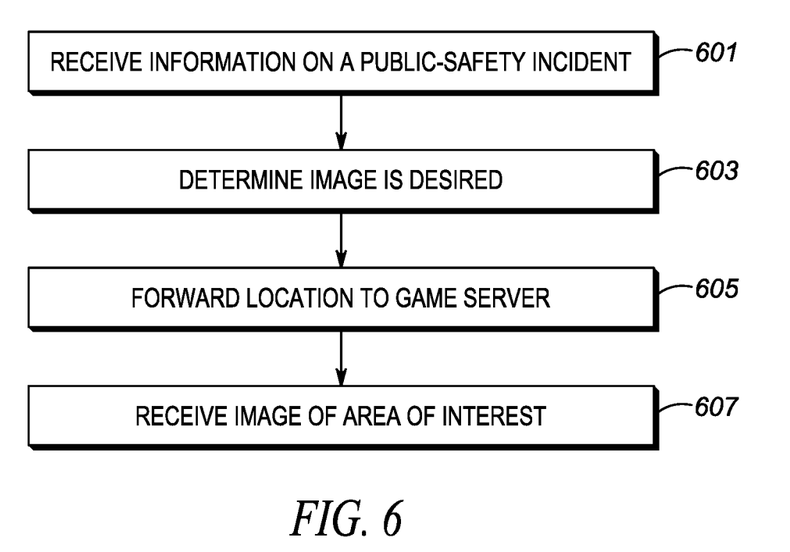
FIG. 6 is a flow chart showing operation of the dispatch center of FIG. 4.

FIG. 6 is a flow chart showing operation of the dispatch center of FIG. 4. In particular, FIG. 6 is a flow chart showing steps (not all necessary) for gathering visual data by a dispatch center. The logic flow begins at step 601 where logic circuitry 403 receives information on a public-safety incident; the information including a location of a public-safety area of interest. It should be noted that the public-safety area of interest may be at the same location as the public-safety incident. In other words, the information on the public-safety incident may simply comprise the location of the incident. Logic circuitry 403 may receive this information from a dispatch operator through GUI 405, or logic circuitry 403 may receive this information automatically as part of a 911 dispatch operation.

At step 603 logic circuitry 403 determines that an image or video of the location of the public-safety area of interest is desired and forwards the location of the public-safety area of interest to an application server (step 605) so that the application server can direct placement or modification of a virtual object within an augmented-reality application based on the location of the public-safety area of interest. Finally, at step 607, logic circuitry 403 receives the image or video of the public-safety area of interest from a player device in response to forwarding.

As discussed, the location of the public-safety area of interest comprises a geographic location, for example, latitude of a longitude. However in an alternate embodiment of the present invention the location may be more descriptive, such as description of point of interest e.g., description of the object of interest that may be in the area: e.g. red car or a description of the person of interest (e.g. man wearing blue jeans and black jacket).

In a preferred embodiment of the present invention, the public-safety incident comprises a crime or a fire, however in alternate embodiments of the present invention the public-safety incident may comprise a public-safety incident taken from the group consisting of a crime, a fire, a terrorist attack, an undercover operation, a suspect surveillance, a gas leak, a traffic accident, a disaster, and a missing person.

As discussed above, logic circuitry 403 may store any image in database 404 and may also instruct transmitter 401 to forward the received image or video to a public safety officer. The step of forwarding the location of the public-safety area of interest may include the step of forwarding the location over a first network, and the step of forwarding the received image or video to the public-safety officer may include the step of forwarding the received image or video over a second network. The first network may comprise a public network and the second network may comprise a public-safety network.

With the above logic flow in mind, the dispatch center of FIG. 4 provides for an apparatus comprising logic circuitry 403 receiving information on an incident and receiving information that an image or video of an incident scene associated with the incident is desired. Transmitter 401 is provided for forwarding a location of an area of interest to an application server so that the application server can direct placement of a virtual object within an augmented-reality application based on the area of interest. Receiver 402 is provided for receiving the image or video of the area of interest from a player device.

Figure 7:
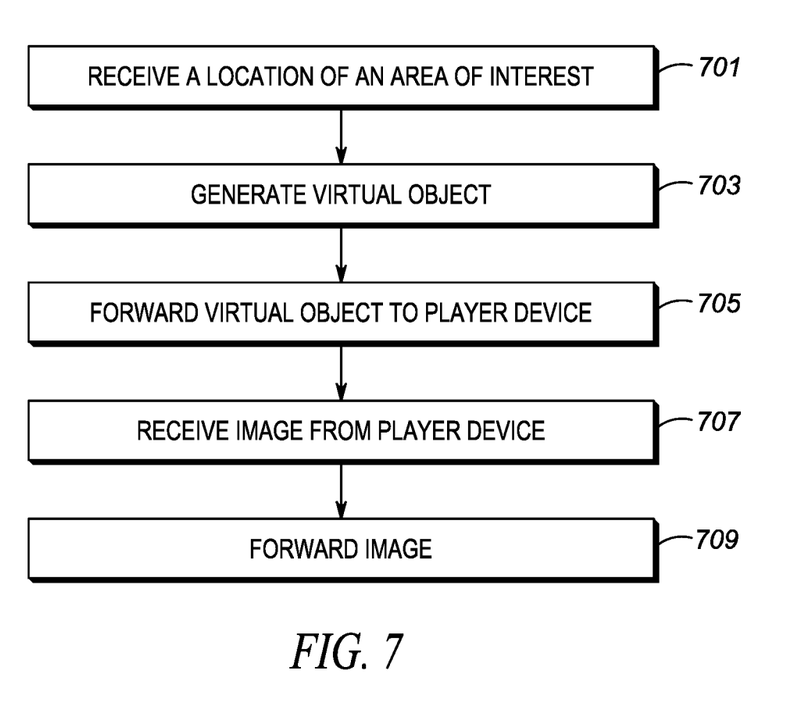
FIG. 7 is a flow chart showing operation of the application server of FIG. 5.

FIG. 7 is a flow chart showing operation of the server of FIG. 5. More particularly, the flow chart of FIG. 7 illustrates those steps (not all necessary) for providing an image to a first entity. In a preferred embodiment the first entity comprises a public-safety dispatch center; however, the first entity may comprise other devices that request an image. For example an officer on a beat may possess a handheld computer and desire an image of an incident.

The logic flow begins at step 701 where network interface 507 receives a location of an area of interest as part of a message from the first entity. Logic circuitry then generates a virtual object or modifies an existing object for an augmented-reality application for a player device, the location of the virtual object based on the location of the area of interest (step 703). The virtual object is forwarded to the player device via network interface 507 (step 705). In response, network interface 507 receives an image of the area of interest from the player device (step 707) and forwards the image to the first entity (step 709).

As discussed above, the virtual object comprises an object that is virtual as opposed to real, wherein the object exists as part of an augmented-reality game in order to direct a camera on the player device to the area of interest. Additionally, the area of interest preferably comprises an area of interest surrounding a public-safety incident, near a public-safety incident (e.g., 100 meters away), or an actual location of the public-safety incident. In alternate embodiments of the present invention the location may comprise location or a description of an object.

In one embodiment of the present invention, the public-safety incident is taken from the group consisting of a crime, a fire, a terrorist attack, an undercover operation, a suspect surveillance, a gas leak, a traffic accident, a disaster, and a missing person. Additionally, the step of receiving the location may comprise the step of receiving the location over a first network (e.g., a public-safety network), while the step of forwarding the virtual object may comprise the step of forwarding the virtual object over a second network (e.g., a public network).

With the above in mind, server 107 provides for an apparatus configured with a network interface for receiving a location of an area of interest as part of a message from the first entity. Logic circuitry 503 is provided for generating a virtual object for an augmented-reality application for a player device, the location of the virtual object based on the location of the area of interest. The network interface forwards the virtual object to the player device, receives an image of the area of interest from the player device, and forwards the image to the first entity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for gathering visual data, the method comprising the steps of:
   receiving information on a public-safety incident; the information including a location of a public-safety area of interest;
   forwarding the location of the public-safety area of interest to an application server so that the application server can direct placement or modification of a virtual character within an augmented-reality game running on a player device, based on the location of the public-safety area of interest, wherein the virtual character is to be superimposed on a view of the real world thus providing a composite view of the real world and the virtual character, and wherein the virtual character is directed to be placed based on the location of the public-safety area of interest so that the virtual character is placed at or near the location of the public-safety area of interest to encourage pointing a camera in the direction of the public-safety area of interest; and
   in response to forwarding, receiving the image or video of the public-safety area of interest from the player device.

2. The method of claim 1 wherein the location of the public-safety area of interest comprises a geographic location or a description of an object.

3. The method of claim 2 wherein the public-safety incident comprises a crime or a fire.

4. The method of claim 2 wherein the public-safety incident is taken from the group consisting of a crime, a fire, a terrorist attack, an undercover operation, a suspect surveillance, a gas leak, a traffic accident, a disaster, and a missing person.

5. The method of claim 1 further comprising the step of:
   forwarding the received image or video to a public-safety officer.

6. The method of claim 5 wherein the step of forwarding the location of the public-safety area of interest comprises the step of forwarding the location over a first network, and wherein the step of forwarding the received image or video to the public-safety officer comprises the step of forwarding the received image or video over a second network.

7. The method of claim 6 wherein the first network comprises a public network and the second network comprises a public-safety network.

8. A method for a dispatch center to obtain an image or video of an incident scene, the method comprising the steps of:
   receiving a location of a public-safety incident;
   forwarding a location of the public-safety incident to an augmented-reality game server so that the augmented-reality game server will direct placement or modification of a virtual object within an augmented-reality game running on a player device, based on the location of the incident scene, wherein the virtual object is to be superimposed on a view of the real world thus providing a composite view of the real world and the virtual object, and wherein the virtual object is directed to be placed based on the location of the public-safety area of interest so that the virtual object is to be placed at or near the location of the public-safety area of interest to encourage pointing a camera in the direction of the public-safety area of interest; and
   in response to forwarding, receiving the image or video of the incident scene from the player device.

9. The method of claim 8 further comprising the steps of:
   forwarding the received image or video to a public-safety officer; and
   wherein the step of forwarding the location of the incident comprises the step of forwarding the location over a public network, and wherein the step of forwarding the received image or video of the incident scene to the public-safety officer comprises the step of forwarding the received image or video over a public-safety network.

10. The method of claim 8 wherein the virtual object comprises a virtual character within the augmented-reality application.

11. An apparatus comprising:
    logic circuitry receiving information on a public-safety incident and receiving information that an image or video of an incident scene associated with the incident is desired;
    a transmitter forwarding a location of a public-safety area of interest to an application server so that the application server can direct placement or modification of a virtual object within an augmented-reality application running on a player device based on the public-safety area of interest, wherein the virtual object is to be superimposed on a view of the real world thus providing a composite view of the real world and the virtual object, and wherein the virtual object is directed to be placed based on the location of the public-safety area of interest so that the virtual object is to be placed at or near the location of the public-safety area of interest to encourage pointing a camera in the direction of the public-safety area of interest; and
    a receiver, in response to forwarding, receiving the image or video of the area of interest from the player device.

12. The apparatus of claim 11 wherein the information on the incident comprises a location of the area of interest.

13. The apparatus of claim 11 wherein the incident is taken from the group consisting of a crime, a fire, a terrorist attack, an undercover operation, a suspect surveillance, a gas leak, a traffic accident, a disaster, and a missing person.

14. The apparatus of claim 11 wherein:
    the transmitter forwards the received image or video to a public-safety officer.

15. The apparatus of claim 14 wherein the location of the area of interest is forwarded over a first network, and the received image or video is forwarded over a second network.

16. The apparatus of claim 15 wherein the first network comprises a public network and the second network comprises a public-safety network.

17. The apparatus of claim 11 wherein the virtual object comprises a virtual character within the augmented-reality application.

* * * * *